March 16, 1954   A. GOETZ   2,672,432
MEANS FOR PERFORMING MICROBIOLOGICAL
ASSAYS OF AEROSOLS AND HYDROSOLS
Filed March 23, 1951

INVENTOR.
ALEXANDER GOETZ
BY
Lyon & Lyon
ATTORNEYS

Patented Mar. 16, 1954

2,672,432

UNITED STATES PATENT OFFICE 2,672,432

MEANS FOR PERFORMING MICROBIOLOGICAL ASSAYS OF AEROSOLS AND HYDROSOLS

Alexander Goetz, Altadena, Calif., assignor, by mesne assignments, to the United States of America as represented by the Secretary of the Army Application March 23, 1951, Serial No. 217,147

5 Claims. (Cl. 195—139)

My invention relates to microbiological assaying; more particularly to means and method of performing microbiological assays of either aerosols or hydrosols.

This application is a continuation in part of my co-pending application, Serial No. 129,272, filed November 25, 1949.

Included in the objects of my invention are:

First, to provide a means and method of microbiological assaying which involves simple and compact equipment so arranged as to facilitate aseptic handling, especially for use under field conditions or under adverse conditions and by operators having a minimum experience.

Second, to provide a means and method of microbiological assaying wherein the equipment may be stored ready for use at any time without delay for such previously required operations as sterilization, preparation of fresh nutrient.

Third, to provide a means and method of microbiological assaying wherein the time required to prepare for, collect and seal each sample is reduced to a minimum, whereby an assay may be performed upon minimum notice and in a minimum of time to meet conditions of emergency.

Fourth, to provide a means and method of microbiological assaying wherein the collecting units or microfilters themselves become the permanent record thus greatly facilitating the maintenance of such records and permitting the counting and analysis of the developed growth at later times, as well as immediately after the incubation period is over.

Fifth, to provide a means and method of microbiological assaying wherein the sample collecting membrane, nutrient pad and water supply cell are contained in an envelope or package unit; that it may be packaged at a central station under controlled conditions and which, when ready for use, requires only removal of the collecting membrane, exposure of this membrane, and re-insertion in the package whereupon the water cell is ruptured to moisten the nutrient pad and the package then re-sealed.

Sixth, to provide a means and method of microbiological assaying wherein the ion producing elements essential as part of the nutrient are dissolved in the water contained in the water supply cell and serve to inhibit reaction between the water and the material, preferably plastic coated aluminum foil, comprising the cell walls; the other constituents of the nutrient being incorporated in the nutrient pad and remaining moisture-free until exposed to the water in said cell thus providing a construction wherein an optimum concentration of nutrient may be supplied.

With the above and other objects in view as may appear hereinafter, reference is directed to the accompanying drawings in which.

Figure 1:
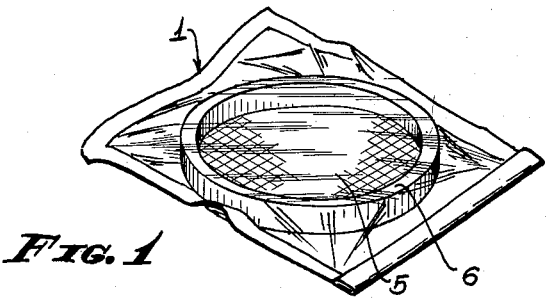
Figure 1 is a perspective view of an assaying assembly forming a part of my invention.

For the purpose of my invention I employ an assaying assembly which includes an envelope 1 having a bottom sheet 2 preferably of metal foil and a top sheet 3 of transparent material to form a window. To avoid inhibitory actions the metal foil should have a thin plastic or lacquer coating. These members are sealed together on three sides leaving an open end 4.

The window is preferably formed of a flexible, impermeable plastic film such as rubber hydrochloride known to the trade as "Pliofilm" or "Saran" or other material which does not leach out harmful chemicals, and which is moisture-proof and readily heat sealable to the metal foil. Also the film should not expand on exposure to high humidity; however, it may shrink slightly under such conditions.

The envelope receives a molecular or microporous filter membrane 5, the margins of which are secured to a rim 6, preferably formed of transparent plastic material and of such height as to provide an adequate air space between the filter membrane and the over-lying window. A filter membrane is selected which is isoporous, and which has a pore configuration suitable for the quantitative retention of microorganisms.

The filter membrane 5 may be composed of a binary system of cellulose ester polymers (acetate or nitrate). These polymers form gel structures which are devoid of discreet structural components such as fibers, and are stable whether wet or dry. A pore volume between 75% and 87% of the total volume of the membrane may be obtained, and the pore size and shape are uniform and may be controlled to provide the desired retention of microorganisms.

The rim 6 is preferably provided with a concave inner surface so as to form an annular lens. Thus light may be introduced laterally and almost parallel with the surface of the membrane and be distributed by the rim member, thus facilitating an early observation of the colonies of microorganisms which may be caused to grow on the membrane.

Also contained in the envelope 1 is a nutrient pad of absorbent material which may be formed of heavy blotting paper. A blotting paper must be selected which will not inhibit or interfere with the growth of microorganisms due to its soluble content such as fillers, sulphites, or similar bleaching chemicals. Its water capacity should be about 2 to 3 ml. of water for a disc of 50 mm. in diameter and its pH must be adjusted to the particular nutrient. The nutrient pad is preferably pre-treated with a nutrient solution which is then de-hydrated. For different purposes, different nutrient solutions are used, and the pad may be dyed an identifying color. The nutrient pad is, of course, dehydrated under conditions which are not destructive to the components of the nutrient.

Below the nutrient pad the envelope contains a water cell 8 formed of two layers of metallic foil, preferably aluminum foil, which have been sealed together to enclose a pre-determined quantity of water. The confronting surfaces of the metal foil comprising the cell walls must be coated with material inhibiting reaction with the water, and preferably the water may contain the soluble ion-forming constituents which are required in most nutrients; for example, sodium chloride or alkali phosphates such as mono- or di-potassium phosphate, and the like. This may serve the double purpose of buffing a chemical reaction between the water and its container, and furnishes the necessary ionic constitutents to the dehydrated nutrient components in the pad.

One margin of the cell 8 is extended to form a leaf 9. Also the margins of the cell may have rudimentary corrugations or clampings. When assembled in the envelope 1, the leaf 9 extends between the open ends of the envelope. The material comprising the cell 8 may be of such character as to fold and crease readily. This is desirable so as to insure proper folding and creasing of the opening end of the envelope before and after use.

In operation, the assaying assembly remains sealed until ready for use whereupon the envelope is opened, the filter membrane with its rim removed, and inserted in a suitable assaying device arranged to provide for measured flow of air or water through the membrane. The membrane is then returned to the envelope, and a needle employed to prick the water cell whereupon light pressure may be applied to exude the water and cause it to be absorbed in the nutrient pad. It will be observed that accurate control of the amount of water can thus be maintained.

It has been found that the air content of the envelope, that is, the area above the nutrient pad should be of pre-determined minimum volume, consequently the height of the rim 6 is chosen which provides the optimum volume of air. Thus when the envelope is re-sealed, the microorganisms collected are caused to grow under non-inhibitory conditions so that quantitive counts can be made as early as possible.

Figure 6:
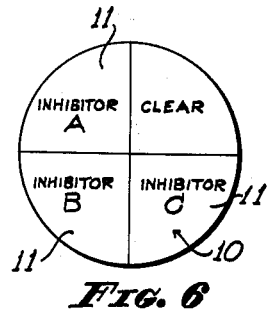
Figure 6 is a diagrammatical plan view of a selector membrane employed to control supply of nutrient to the collector membrane.
Figure 2:
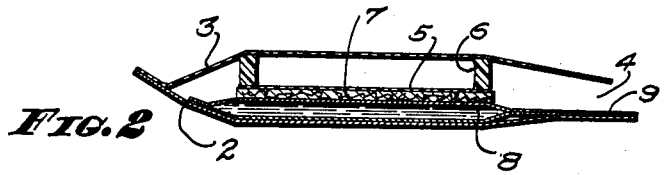
Figure 2 is a longitudinal, sectional view thereof with the assembly open for removal of the sample collecting membrane.
Figure 3:
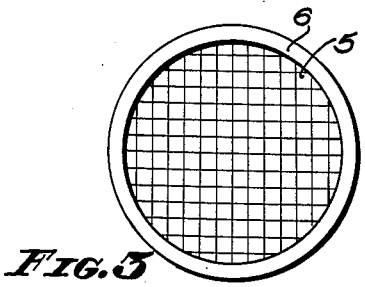
Figure 3 is a plan view of the sample collecting or filter membrane.
Figure 7:
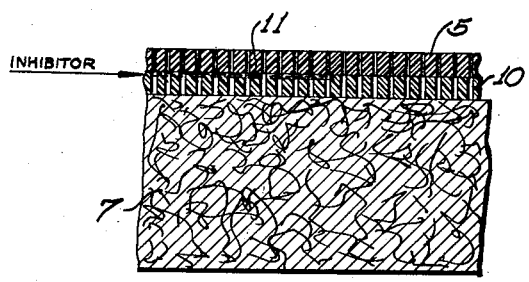
Figure 7 is a diagrammatical view illustrating the mode of operation of the selector membrane.
Figure 4:
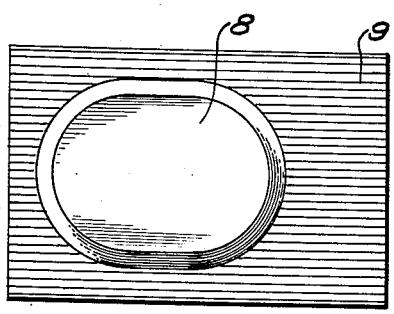
Figure 4 is a plan view of the water supply cell.
Figure 5:
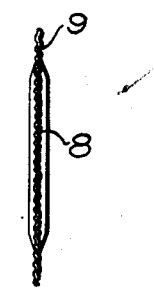
Figure 5 is an end view thereof.

It is sometimes desirable to separate or distinguish various microorganisms or to control the growth of different types on a single assaying membrane. This may be done by providing a second or selector membrane 10 preferably having a slightly greater porosity than the filter membrane 5. Imprinted on the selector membrane 10 are coatings of one or more inhibitors 11. Alternatively depending on the character of the inhibitor, the inhibiting material may be impregnated in the selector membrane. For example, such imprints may be arranged in quadrants as shown in Figure 6. The imprints are preferably on the side of the selector membrane confronting the filter membrane. Thus, the nutrient on passing from the pad through the two membranes carries the inhibitor together with the re-hydrated nutrient to the surface upon which the bacteria are deposited minimizing any lateral diffusion across the former.

By a proper choice of inhibitors selected microorganisms may be caused to grow in preference to others on different sections of a single filter membrane with defined borders between the various areas.

Having thus described certain embodiments and applications of my invention, I do not desire to be limited thereto, but intend to claim all novelty inherent in the appended claims.

I claim:

1. An assembly for effecting controlled microbiological cultures involving: a filter membrane substantially impermeable to microorganisms but permeable to air and liquids; an initially dehydrated nutrient pad in contact with a surface of said membrane; an initially sealed water cell and an envelope adapted to receive said membrane and said pad and cell, said cell being rupturable to supply water to said pad for transfer of nutriment to microorganisms present on said membrane.

2. An assembly for effecting controlled microbiological cultures involving: an initially sealed water cell; an absorbent pad containing nutriment for microorganisms positioned contiguous to said cell to receive the water therefrom; a filter membrane overlying said pad and a sealable envelope for said membrane, pad and cell, said envelope including a transparent window spaced from said membrane.

3. An assembly for effecting controlled microbiological cultures involving: an initially sealed water cell; an absorbent pad containing nutriment for microorganisms positioned contiguous to said cell to receive the water therefrom; a filter membrane overlying said pad; a transparent rim for said membrane; and a sealable envelope for said membrane, rim, pad and cell.

4. An assembly for effecting controlled microbiological cultures involving: an initially sealed water cell; an absorbent pad containing nutriment for microorganisms positioned contiguous to said cell to receive the water therefrom; a filter membrane overlying said pad and a sealable envelope for said membrane, pad and cell, said envelope including a transparent window spaced from said membrane; a permeable element interposed between said nutriment pad and membrane; and a microorganism growth controlling agent incorporated in at least a portion of the area of said permeable element.

5. An assaying cell for microorganisms, involving: a first filter member having a front surface for the collection of microorganisms, a second filter member disposed contiguously to the back surface of said first filter, said second filter having areas treated with growth inhibiting and controlling substances; an absorbent member in contact with said second filter; and containing a nutrient; a water cell for supplying a fixed quantity of water to said absorbent member; and an envelope containing said filters, absorbent member and water cell.

ALEXANDER GOETZ.

References Cited in the file of this patent

UNITED STATES PATENTS

| Number | Name | Date |
|---|---|---|
| 2,046,566 | Lucas | July 7, 1926 |
| 2,292,450 | Kohn | Aug. 11, 1942 |

OTHER REFERENCES

Dusseau: Science 88, No. 2287, October 10, 1938, page 412.

Harmsen et al.: Science 105, May 30, 1947, pages 582, 583.

McCulloch: Disinfection and Sterilization, Lea and Fibiger, Phila., Pa., 2 ed., 1948, pages 192–193.